United States Patent [19]
White

[11] Patent Number: 6,098,738
[45] Date of Patent: Aug. 8, 2000

[54] HYDRAULIC DRIVE SYSTEM FOR A VEHICLE

[76] Inventor: Harvey White, 208 Kensington Park, Nashville, Tenn. 37215

[21] Appl. No.: 09/111,979

[22] Filed: Jul. 8, 1998

[51] Int. Cl.[7] ..................................................... B60K 1/00
[52] U.S. Cl. .......................... 180/308; 180/242; 180/243
[58] Field of Search ..................................... 180/305, 307, 180/242, 243, 308

[56] References Cited

U.S. PATENT DOCUMENTS

| | | | |
|---|---|---|---|
| 3,680,652 | 8/1972 | Greene | 180/305 |
| 3,702,642 | 11/1972 | Greene | 180/307 |
| 3,984,978 | 10/1976 | Alderson | 60/422 |
| 4,340,126 | 7/1982 | Larson | 180/305 |
| 4,651,846 | 3/1987 | Headrick | 180/243 |
| 4,694,647 | 9/1987 | Yoshida | 60/442 |
| 4,773,219 | 9/1988 | Bagwell | 60/484 |
| 5,147,011 | 9/1992 | Hvolka | 180/234 |
| 5,222,568 | 6/1993 | Higasa et al. | 180/65.5 |
| 5,263,401 | 11/1993 | Walker | 91/491 |
| 5,427,195 | 6/1995 | Paul et al. | 180/308 |
| 5,607,027 | 3/1997 | Puett, Jr. | 180/242 |
| 5,720,360 | 2/1998 | Clark et al. | 180/305 |
| 5,810,106 | 9/1998 | McCoy | 180/243 |
| 5,819,870 | 10/1998 | Braun | 180/305 |
| 5,823,284 | 10/1998 | Hoar et al. | 180/240 |
| 5,848,664 | 12/1998 | Kaspar | 180/308 |
| 5,957,235 | 9/1999 | Nishimura et al. | 180/306 |

*Primary Examiner*—J. J. Swann
*Assistant Examiner*—L. Lum
*Attorney, Agent, or Firm*—Woodling, Krost & Rust

[57] ABSTRACT

A drive system for a hydraulically driven vehicle which includes bidirectional hydraulic motors. Two front hydraulic motors are in parallel as are two rear hydraulic motors. One of the front hydraulic motors is in series with the rear hydraulic motor on the same side of the vehicle. The other front hydraulic motors is in series with the rear hydraulic motor in the other side of the vehicle. The rear hydraulic motors include mechanical brakes in combination. The front hydraulic motors are mounted as part of the spindles which pivot about king pins.

8 Claims, 5 Drawing Sheets

HYDRAULIC DRIVE SYSTEM FOR A VEHICLE

FIELD OF THE INVENTION

This invention relates to a hydraulically powered vehicle. In particular, this invention relates to a hydraulically powered vehicle where each of four wheels is driven by a hydraulic motor.

BACKGROUND OF THE INVENTION

John Deere® manufactures a four and six wheel vehicle named the Gator Utility Vehicle. These vehicles are used in a variety of applications and can embody two and four wheel drive versions. The Gator Utility Vehicle is powered by a gasoline or diesel engine. The Gator Utility Vehicle produced and sold by John Deere includes a continuously variable transmission combined with a chain drive for the four wheel drive version. The instant invention is a modification to the drive system that can be used on the Gator Utility Vehicle and/or other similar vehicles.

U.S. Pat. No. 4,694,647 to Yoshida is directed to the control of a bidirectional hydraulic motor but does not disclose the use of four bidirectional hydraulic motors for the drive system of a utility vehicle.

SUMMARY OF THE INVENTION

It is an object of the present invention to provide a hydraulically powered drive system for a utility vehicle. A gasoline powered engine provides power to a hydraulic pump. The hydraulic pump has a power take off for supplying secondary equipment.

It is an object of the present invention to provide a bidirectional control means for the hydraulically powered drive system for a utility vehicle whereby hydraulic fluid can be directed in either of two directions in the quantity. In the preferred embodiment an infinite positioning self-locking control is employed.

It is a further object of the present invention to provide a piston pump which includes two pressure ports for use in a hydraulically powered drive system. The pressure can be supplied from either of the two ports of the pump depending on the position of a cam within the pump.

It is an object of the present invention to provide a drive system for a utility vehicle which can carry a payload up to 1,400 pounds up a steep incline or grade.

It is an object of the present invention to provide a utility vehicle driven by four bidirectional hydraulic motors, each of which drive a respective wheel.

It is an object of the present invention to provide a utility vehicle with a hydraulic circuit which supplies pressurized hydraulic fluid in parallel to the front wheels and then supplies pressurized hydraulic fluid to the rear wheels.

It is an object of the present invention to provide a utility vehicle with a hydraulic circuit which supplies pressurized hydraulic fluid to the front wheels and then to the rear wheels in series. More specifically, the pressurized hydraulic fluid is first directed to the front wheels in parallel. The fluid is then directed to the rear wheels which are said to be in series with the wheels to which the fluid was first directed.

It is an object of the present invention to provide a utility vehicle with a hydraulic circuit which supplies pressurized hydraulic fluid to the rear wheels and then to the front wheels in series. More specifically, the pressurized hydraulic fluid is first directed to the rear wheels in parallel. The fluid is then directed to the front wheels which are said to be in series with the wheels to which the fluid was first directed.

It is an object of the present invention to provide a drive system for a utility vehicle which includes two rear wheel motors equipped with mechanical brakes.

A drive system for a utility vehicle comprises a first bidirectional hydraulic motor, a second bidirectional hydraulic motor, a third bidirectional hydraulic motor, and a fourth bidirectional hydraulic motor. A bidirectional hydraulic pump supplies pressurized hydraulic fluid from either of two ports as desired in the desired quantity. The fluid is directed in parallel to the first and second bidirectional motors which are located in the front of the vehicle to cause the vehicle to move in a first direction. This direction could be forward or rearward as desired. The fluid is supplied into and through the first and a second bidirectional motors (i.e., the front motors) and is then directed in series to the third and fourth bidirectional motors (i.e., the rear motors), respectively. The fluid, after it passes through the rear motors, is then directed back to the pump where it is then pumped again. An infinite positioning control means is used to control a cam plate within the hydraulic pump.

Alternatively, the fluid is directed in parallel to the third and fourth bidirectional motors which are located in the rear of the vehicle to cause the vehicle to move in a second direction. This direction could be forward or rearward as desired. The fluid is supplied into and through the third and fourth bidirectional motors (i.e., the rear motors) and is then directed in series to the first and second bidirectional motors (i.e., the front motors), respectively. The fluid, after it passes through the front motors, is then directed back to the pump where it is then pumped again. An infinite positioning control means is used to control a cam plate within the hydraulic pump.

A better understanding of the invention will be gained upon reading the Brief Description of the Drawings and the Detailed Description of the Invention which follow.

DETAILED DESCRIPTION OF THE INVENTION

Figure 1:
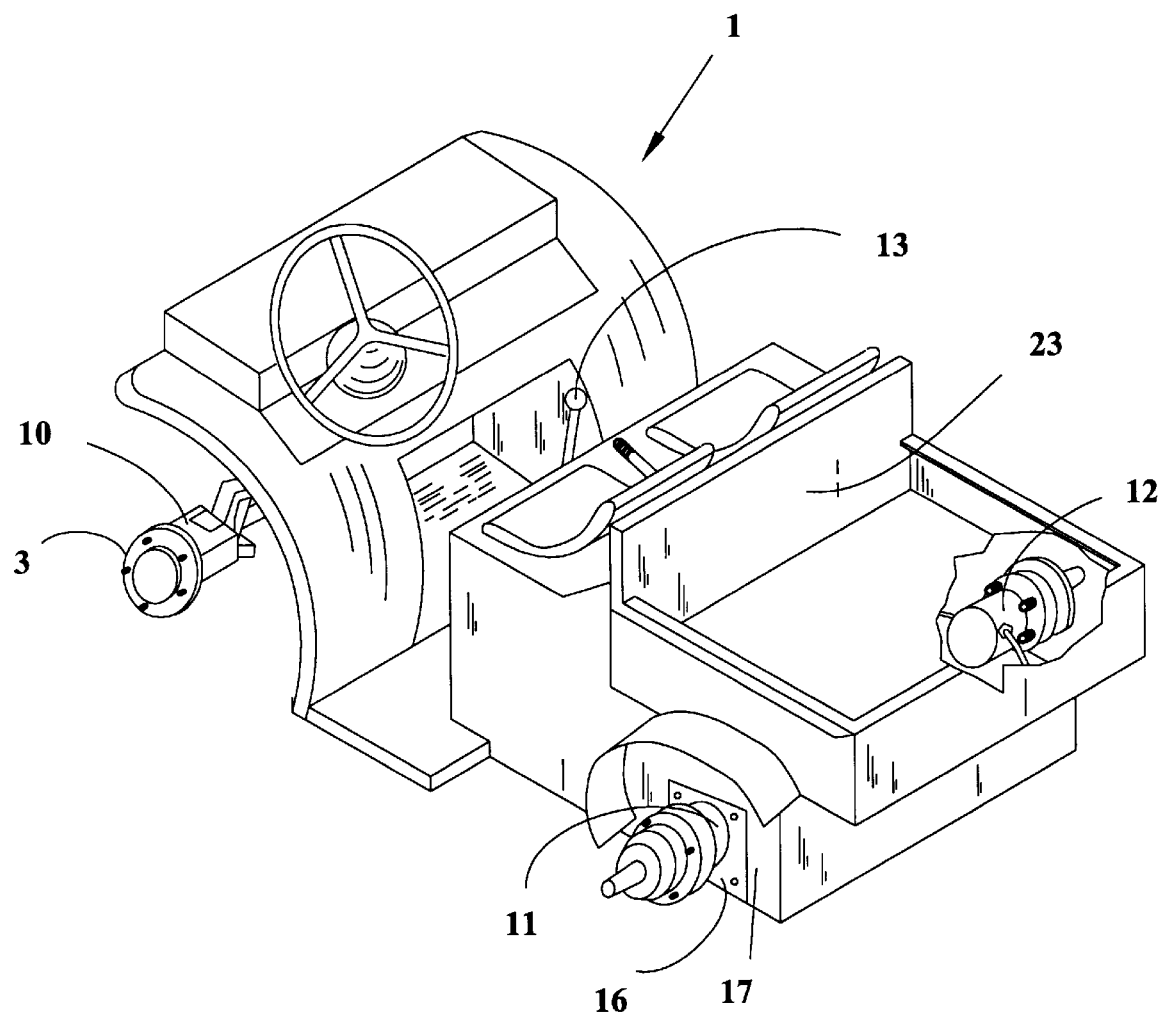
FIG. 1 is an isometric view of the vehicle illustrating the front left hydraulic motor, and both rear hydraulic motors.
Figure 5:
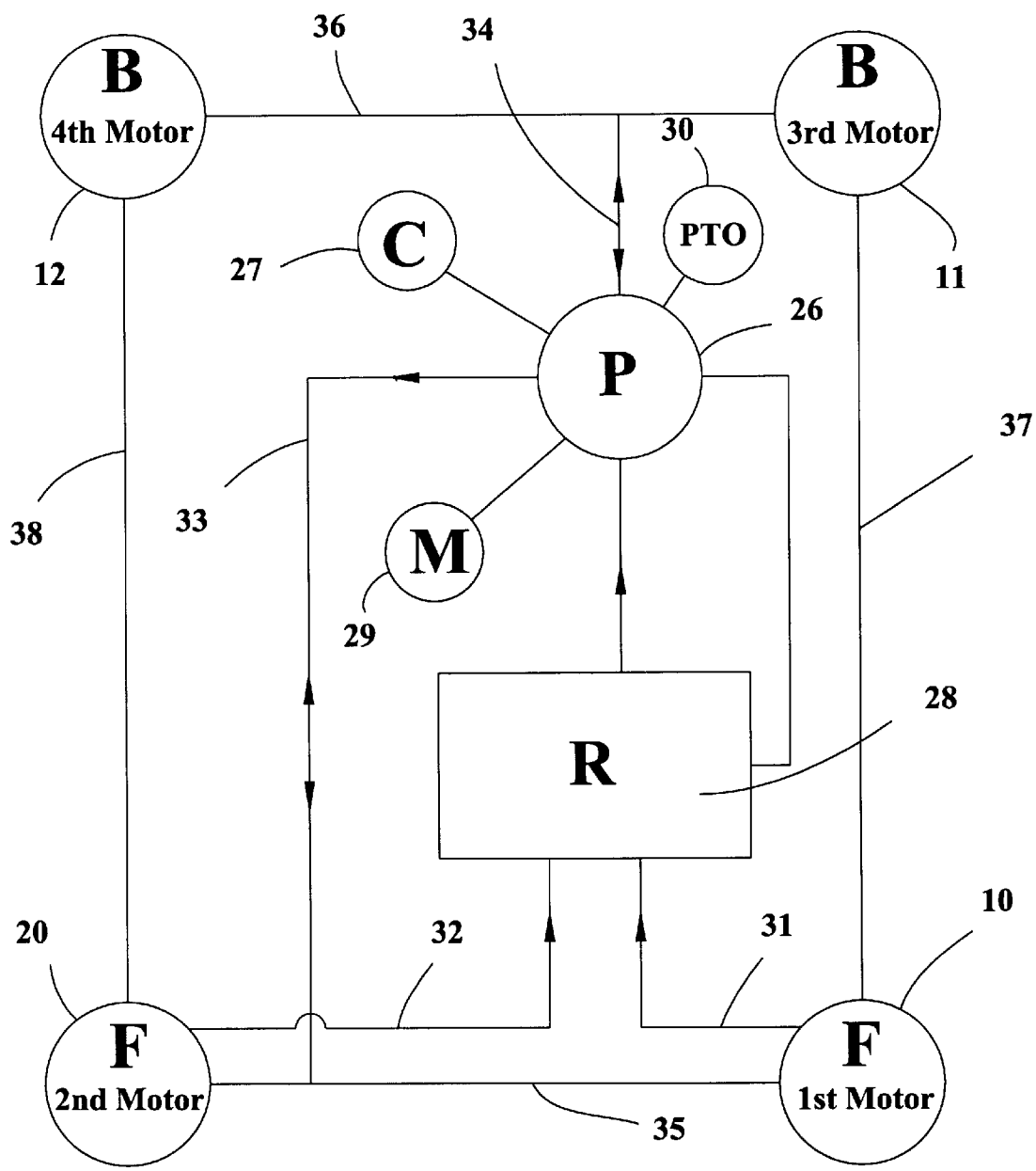
FIG. 5 is a schematic representation of the hydraulic fluid path, the flow controller, pump, reservoir and front and back (rear) hydraulic motors.

FIG. 1 is an isometric view of the vehicle illustrating the front left hydraulic motor 10, and both rear hydraulic motors 11, 12. Reference numeral 13 denotes the infinite positioning control for the pump which is not shown is this drawing figure. Reference numeral 1 is used to identify the utility vehicle. In the preferred embodiment the infinite positioning mechanism is a Quadrastat® self-locking control. Quadrastatg® is a registered trademark of Quadrastat Corporation, 4040 S. Capitol Avenue, City of Industry, Calif. 91749. The pump 26 which is shown diagrammatically in FIG. 5 is an Eaton® piston pump model no. 70142. Eaton is a registered trademark of Eaton Corporation, 15151 Hwy. 5, Eden Praire, Minn. 55344. The Eaton pump is a bidirectional pump meaning that it can supply pressure and flow from either of two output ports. If flow is out of one output port then it returns by the other port and vice versa. The Eaton pump includes a cam plate which is positionable by the Quadrastat control. In this way the direction and quantity of the flow out of the pump is controlled by the operator simply positioning the controls.

FIG. 1 also illustrates the mounting plate 16 which is used to mount the rear motors. Mounting plate 16 is bolted to the frame 17 of the utility vehicle. FIG. 1 also illustrates the wheel mount 3 and nut and the bed of the vehicle 23.

Figure 2:
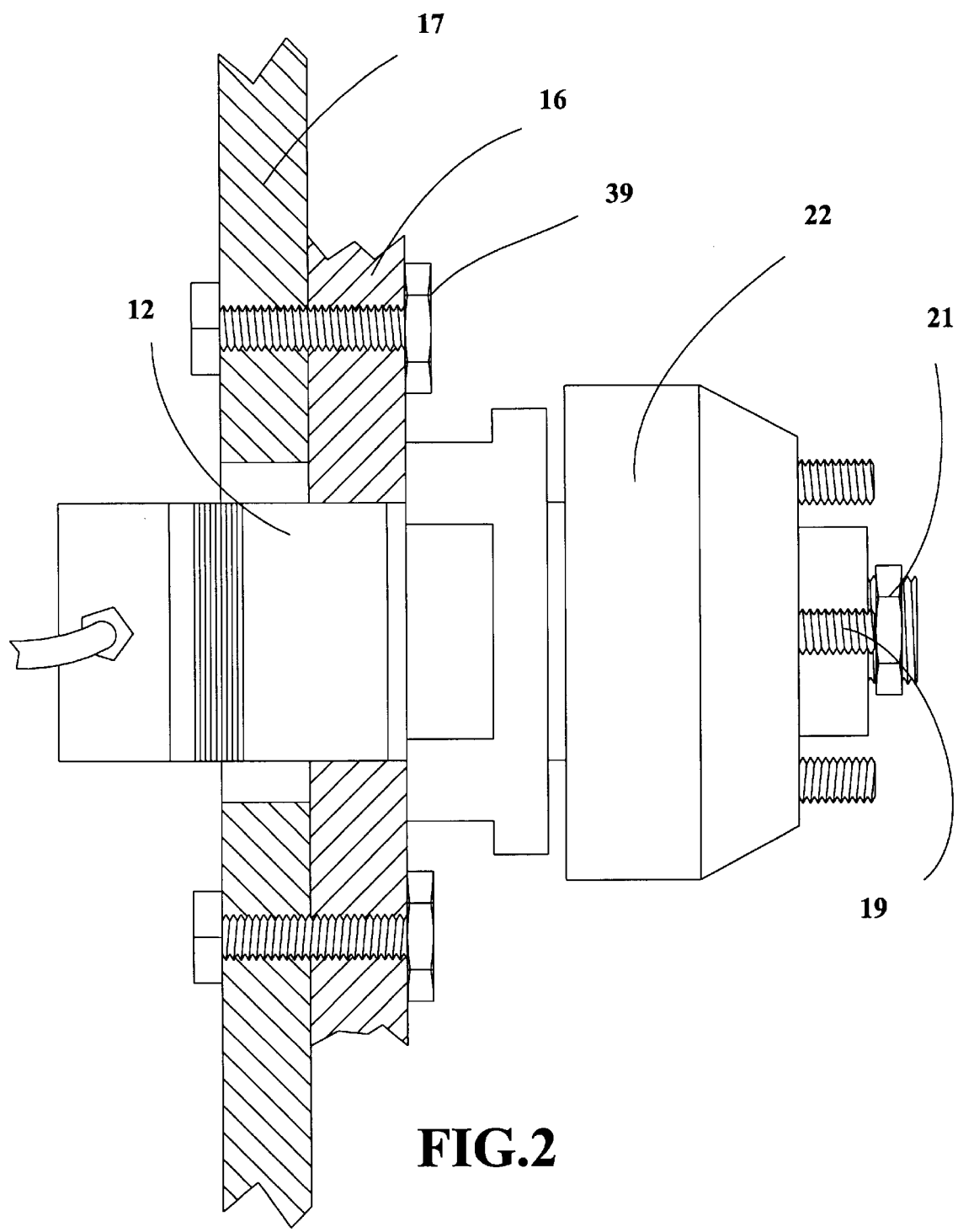
FIG. 2 is a view of one of the rear hydraulic motors together with the drum and brake assembly shown in position flush against the mounting plate 16.

FIG. 2 is a view of one of the rear hydraulic motors, i.e., rear motor 12, together with the hub and drum brake 22 assembly shown in position flush against the mounting plate 16. Reference numeral 24 illustrates the studs on the hub and drum brake 24 for use in mounting a rim and tire assembly thereto. Nut 21 affixes the hub and drum brake 22 to the rotating shaft 25 of the rear motor. Also See FIG. 4 wherein the rotating shaft 25 which includes threads 19 are illustrated. FIG. 2 illustrates bolt and nut assembly 39 affixing plate 16 to the frame 17.

Figure 3:
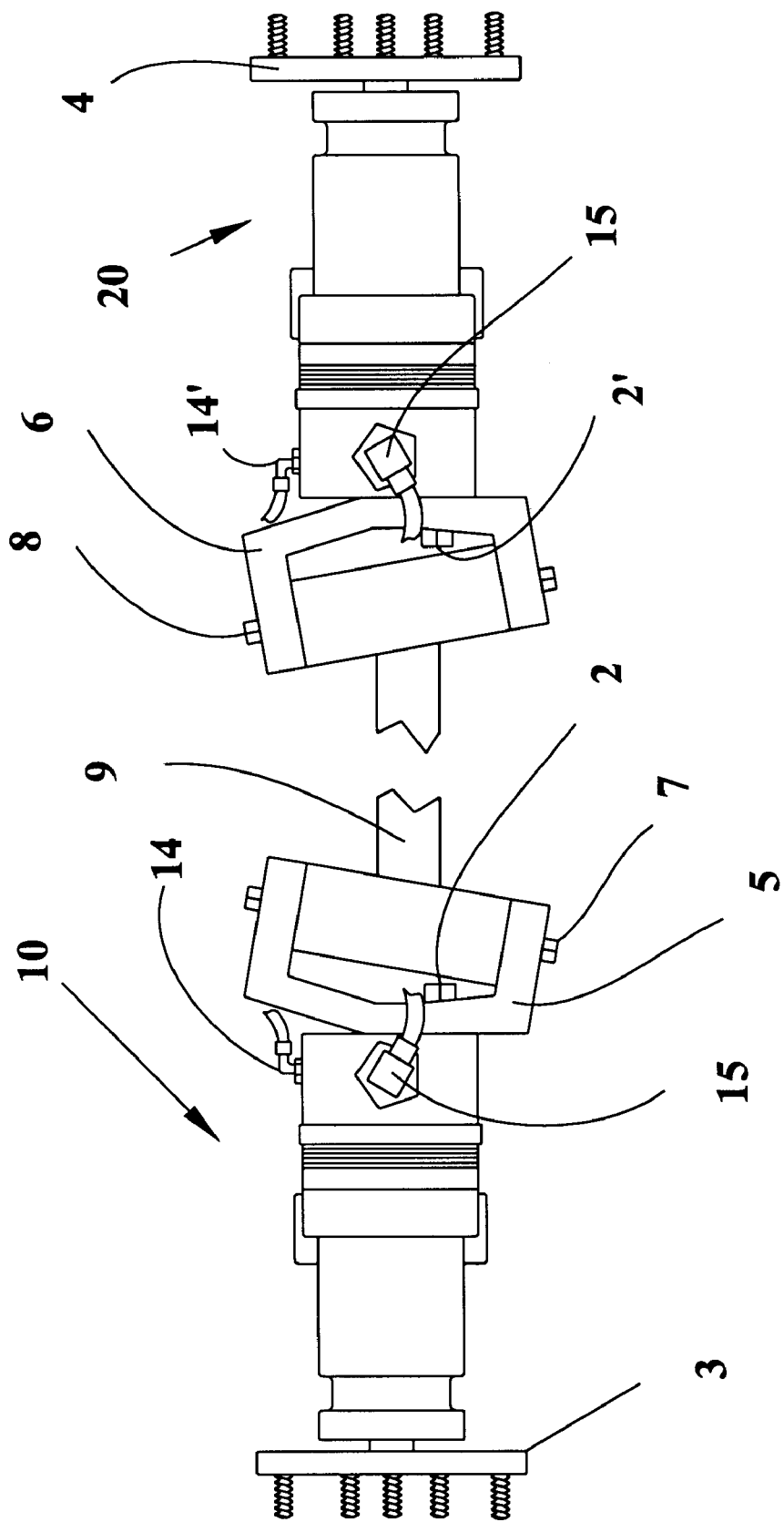
FIG. 3 is an elevational view of the front axle together with spindles, king pins and hydraulic motors affixed to the spindles.

FIG. 3 is an elevational view of the front axle together with the spindles, king pins and hydraulic motors (10, 20) affixed to the spindles. FIG. 3 also illustrates wheel mounts 3, 4 affixed to the motors 10, 20 respectively. Spindles 5, 6 are affixed to the respective hydraulic motors 10, 20 by means of threaded bolts 2, 2', respectively. King pins 7, 8 are affixed to the axle 9. Kings pins 7, 8 allow steering of the utility vehicle. References numerals 15 and 15' denotes a hydraulic fluid connection to the motors 10, 20. Relief ports 14, 14' provide for minimum flow through the hydraulic circuit as will be discussed further below.

The bidirectional hydraulic motors used on the front of the vehicle are HB Series motors available from White Hydraulics, Inc., 110 Bill Bryan Blvd., P.O. Box 1127, Hopkinsville, Ky. 42241-1127. The motors have two ports and fluid can be directed into either of the two ports for operation of the motor in the desired direction.

Figure 4:
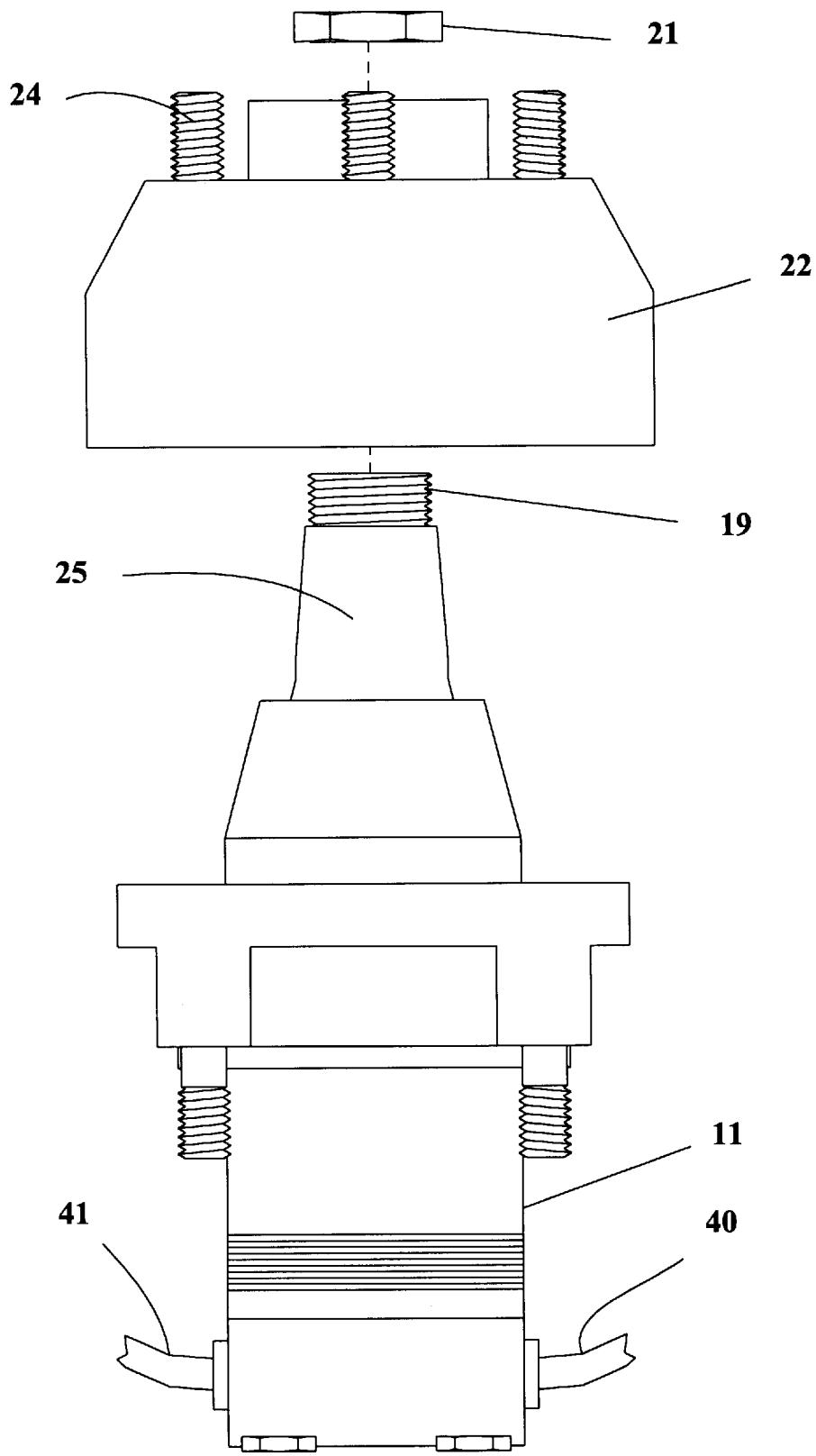
FIG. 4 is a view of the rear hydraulic motors together with the wheel rim/brake drum.

FIG. 4 is a view of the rear hydraulic motors together with the wheel rim/brake drum. FIG. 4 illustrates the assembly of one of the rear motors 11. Reference numerals 40 and 41' denote the fluid connections into the motor. The rear fluid motors are bidirectional hub drum motors produced by White Hydraulics, Inc., 110 Bill Bryan Blvd., P.O. Box 1127, Hopkinsville, Ky. 42241-1127.

FIG. 5 is a schematic representation of the hydraulic fluid path, the flow controller 27, pump 26, reservoir 28, gasoline/diesel powered engine 29, power take off 30 from the pump, as well as the front motors (10, 20) and the rear motors (11, 12). Reference numerals 31, 32 represent relief conduits which provide for flow through the circuit to prevent cavitation of the pump in low flow conditions.

Pump 26 is controlled by controller 27 as explained above. Flow is directed out of the pump through either conduits 33 or 34. Conduits 33, 34 also act as return lines to the pump if that line is not selected by the controller as the pressurized output line. If the controller selects line 33 as the output line fluid will first be directed to conduit 35 and distributed in parallel to the front motors 10, 20. The fluid causes the motors to rotate in a first direction. The fluid continues in conduits 37 and 38 to the rear motors 11, 12 which are said to be in series with the front motors 10, 20. The fluid causes the motors to rotate in the same first direction. Fluid exits motors 11, 12 by means of conduit 36 and progresses through conduit 34. Conduits 33, 34 are referred to as discharge/return lines. Alternatively, fluid could first be directed in parallel to the rear motors by way of conduits 34 and 36 causing rotation of the rear motors in a second direction. The fluid then passes in conduits 37, 38 to front motors 10, 20 which are said to be in parallel with the respective rear motors. This causes rotation of the front motors in the same second direction. The fluid is then returned to the pump by way of conduit 33.

It will be understood by those skilled in the art that the motors could be connected in such a way that the vehicle may move in a given first direction, i.e., forward, regardless if the fluid is first directed to the front or the rear wheels in parallel. It will also be understood by those skilled in the are that the White Hydraulics rear motors include brakes for stopping the vehicle.

The drive system of the present invention has been found to provide superb handling and power for climbing up and down steep inclines. This system generally insures that even if one wheel were not in contact with the ground that the remaining wheels would be effectively active in propelling the vehicle.

The foregoing description has been set forth by way of example only. Those skilled in the art will realize that many modifications and changes may be made to the invention without deviating from the spirit and scope of the attached claims.

What is claimed is:

1. A drive system for a utility vehicle comprising a first hydraulic motor, a second hydraulic motor, a third hydraulic motor and a fourth hydraulic motor; a hydraulic pump; control means for directing pressurized hydraulic fluid to said first and second hydraulic motors or to said third an fourth hydraulic motors; said first and second hydraulic motors being in parallel or said third and fourth hydraulic motors being in parallel; and, said first and third hydraulic motors being in series and said second and fourth hydraulic motors being in series.

2. A drive system for a utility vehicle as claimed in claim 1 wherein each of said first, second, third and fourth hydraulic motors includes a wheel rim affixed thereto and rotatable therewith.

3. A drive system for a utility vehicle as claimed in claim 2 further comprising a reservoir storing said hydraulic fluid.

4. A drive system for a utility vehicle as claimed in claim 1 further comprising mounting means for mounting said first and second hydraulic motors to said vehicle.

5. A drive system for a utility vehicle as claimed in claim 4 wherein said mounting means includes a kingpin and a spindle; said spindle rotatable with respect to said king pin; said hydraulic motor affixed to said spindle.

6. A drive system for a utility vehicle as claimed in claim 1 further comprising a mechanical brake assembly in combination with said third and fourth hydraulic motors.

7. A drive system for a utility vehicle as claimed in claim 1 wherein said first, second, third and fourth hydraulic motors are bidirectional.

8. A drive system for a utility vehicle as claimed in claim 1 wherein said pump is a bidirectional pump.

* * * * *